United States Patent
Lai

(10) Patent No.: US 7,567,533 B2
(45) Date of Patent: Jul. 28, 2009

(54) PACKET DETECTION SYSTEM, PACKET DETECTION DEVICE, AND METHOD FOR RECEIVING PACKETS

(75) Inventor: Jyh-Ting Lai, Hsin-Chu (TW)

(73) Assignee: Faraday Technology Corp., Hsin-Chu (TW)

( * ) Notice: Subject to any disclaimer, the term of this patent is extended or adjusted under 35 U.S.C. 154(b) by 714 days.

(21) Appl. No.: 11/380,656

(22) Filed: Apr. 28, 2006

(65) Prior Publication Data

US 2007/0014286 A1    Jan. 18, 2007

(30) Foreign Application Priority Data

Jul. 15, 2005  (TW) ............................... 94124216 A

(51) Int. Cl.
*H04Q 7/00* (2006.01)
*H04B 17/00* (2006.01)
(52) U.S. Cl. ................ 370/330; 370/321; 370/344; 370/347; 370/350; 370/436; 455/214; 455/213; 455/306; 455/115.4; 455/242.1; 375/360; 375/134; 375/143; 375/152; 375/359
(58) Field of Classification Search ............... 370/321, 370/294, 295, 330, 336, 345, 436, 478, 517, 370/324, 350; 455/67.13, 214, 224, 263, 455/336
See application file for complete search history.

(56) References Cited

U.S. PATENT DOCUMENTS

| | | | |
|---|---|---|---|
| 5,732,113 A | 3/1998 | Schmidl | |
| 2002/0126618 A1 | 9/2002 | Kim | |
| 2004/0213579 A1* | 10/2004 | Chew et al. | ................ 398/183 |
| 2006/0008017 A1* | 1/2006 | Balakrishnan et al. | ...... 375/260 |
| 2006/0018347 A1* | 1/2006 | Agrawal | ..................... 370/537 |

FOREIGN PATENT DOCUMENTS

| | | |
|---|---|---|
| TW | 577202 | 2/2004 |
| TW | I234951 | 6/2005 |

* cited by examiner

*Primary Examiner*—Huy Q Phan
(74) *Attorney, Agent, or Firm*—Winston Hsu

(57) ABSTRACT

A packet detector for a multi-band orthogonal frequency division multiplexing system includes a plurality of packet detection units each corresponding to a time frequency code for detecting packets according to a spreading sequence of the time frequency code, a comparison unit for comparing correlation values provided by division units of the plurality of packet detection units, and a packet decision module for determining a time frequency code and size of a fast Fourier transform sampling window according to output signals of the comparison unit, allowing a frequency band to be selected and synchronization to be executed.

20 Claims, 9 Drawing Sheets

PACKET DETECTION SYSTEM, PACKET DETECTION DEVICE, AND METHOD FOR RECEIVING PACKETS

BACKGROUND OF THE INVENTION

1. Field of the Invention

The present invention relates to a packet detection system utilized in a multi-band orthogonal frequency division multiplexing system, and more particularly, to a packet detection unit of a packet detection system set to correspond to different time frequency codes.

2. Description of the Prior Art

In recent years, wireless communication technology and devices have taken a big leap with advances in research and development. More specifically in the field of wireless personal area network (WPAN), the WPAN technique allows users to establish personal wireless transmitting spaces with a longest diameter of 10 meters. Nowadays, the two major WPAN techniques are respectively "Bluetooth" and infrared transmission. "Bluetooth" utilizes EM waves, which are hardly blocked by any obstacle, to transmit data while the infrared transmission can achieve high-speed transmission within a certain distance such as one meter. These technological advances have made obtaining information, and communication between people significantly easier and faster. For this reason, the development of wireless personal area network is commonly recognized as one of the most significant technologies of network communication.

Typically, Inter Symbol Interference (ISI) is largely caused by a limited bandwidth in high-speed data transmission, producing interference in the transmitted data. In wireless communication technology, an orthogonal frequency division multiplexing system is capable of utilizing a simpler frequency domain equalizer to replace a more complicated time domain equalizer. Therefore, orthogonal frequency division multiplexing technology is widely utilized in every advanced digital communication system including: digital video broadcast, ultra wideband technology, and so forth.

Ultra wideband (UWB) systems incorporate a multi-band orthogonal frequency division multiplexing (MB-OFDM) technology. The MB-OFDM method begins by separating a frequency spectrum into several sub-bands. Each sub-band bandwidth length is 4.125 MHz. Each domain orthogonal frequency division multiplexing (OFMD) symbol is transmitted via a time-interleaved method across the sub-band. With reference to FIG. 1, please note that the signal transmission will be limited to a sub-frequency band at any given time. The main advantage of utilizing the time-interleaved method is that an average transmitted power is the same as a system designed to operate over the entire bandwidth, and information is processed over much smaller bandwidth (~500 MHz). Thus usage elasticity of the frequency spectrum increases, as does compatibility with world telecommunication regulations.

In order to realize the advantage of the above system, the receiving end of the MB-OFDM system is required to be fast and accurate in order to select the appropriate timing and frequency band (which is time synchronization and frequency synchronization). Therefore, the receiving end of a packet detection device is crucial.

FIG. 2 illustrates a diagram of a conventional packet detection device 20. The operation of the packet detection device 20 is well known to those skilled in the art and thus it does not need to be further explained. The receiving end of a conventional communication system is capable of determining whether a received signal r(n) is data or noise via the packet detection device 20. When data is received, an output signal M(n) of the packet detection device 20 is close to a high-level signal. On the other hand, when noise is received (White Gaussian Noise (WGN) for example), the output signal M(n) will be close to a low-level signal.

The receiving end of the conventional communication system is capable of determining whether a data packet is received via the packet detection device 20. However, the packet detection device 20 is not operable with the ultra wideband wireless communication system utilizing the MB-OFDM technology for the reasons listed below:

1. Frequency hopping: the MB-OFDM technology utilizes the frequency hopping method such that a frequency band utilized by a symbol is different from the frequency band utilized by a previous symbol. This protocol prevents a traditional packet detection device 20 from detecting an incoming packet accurately. The frequency hopping method refers to the transmission end, which will switch to different carrier frequency band to transmit signals. Therefore only a predetermined receiving end can receive signals accurately. For other receiving ends, the hopping signals generated by the frequency hopping technology are merely noise.

2. Time frequency code: To allow the receiving end to accurately receive signals, the transmission end sets the time frequency code at the front end of an output signal for describing timing, and the receiving end selects different timing and frequency hopping sequences according to different time frequency codes. However, the traditional packet detection device 20 cannot detect the corresponding packet due to different time frequency codes. Therefore the traditional packet detection device 20 is not applicable on the UWB wireless communication system utilizing MB-OFDM technology.

3. Timing detection issue: when the transmission end of the MF-OFDM system utilizes a zero-padding prefix, the receiving end cannot obtain accurate timing information. This prevents the packet detection device 20 from determining a timing position of a fast Fourier transform (FFT) sampling window.

In regards to the timing detection issue mentioned above, please refer to the following explanation. For the traditional orthogonal frequency division multiplexing system as shown in FIG. 3, after processing a baseband signal in the transmission end, the data will first be transmitted to an Inverse Fast Fourier Transform (IFFT) where the tail part of a symbol will then be prefixed to the beginning of the symbol (IFFT o/p). The prefixed part is called a cyclic prefix. On the contrary, the cyclic prefix is removed from the symbol passing through a channel and the symbol will be received by the FFT. When there is ISI caused by limited bandwidth, the cyclic prefix maintains the FFT sub-carrier of the FFT window. Therefore, the effect created by the ISI can now be eliminated. However, when the zero-padding prefix is employed in the MB-OFDM system (as shown in FIG. 4), the conventional packet detector cannot determine the precise FFT window position thus the processing of the signal afterwards will be affected.

Therefore in order to realize high-speed transmission through a multi-band orthogonal frequency division multiplexing system, design of the receiving end of the packet detection device is a very relevant issue.

SUMMARY OF THE INVENTION

The main objective of the claimed invention is to provide a packet detection system, a packet detection device and a method for processing and receiving packets.

The claimed invention discloses a packet detection system comprising a plurality of packet detection units, each packet detection unit corresponds to a time frequency code for detecting packets according to a preamble sequence of the time frequency code, a comparison unit for comparing a correlation value outputted by a division unit of the plurality of packet detection units, and a packet decision module for determining a timing position of the time frequency code and a fast Fourier transform sampling window for the packet received by the packet detection system corresponding to the signal outputted by the packet detection system. Each packet detection unit comprises a signal receiving end for receiving signals, and a series of delay units connected in a sequence. Each delay unit is utilized for delaying signals by a clock cycle, and the first delay unit of the plurality of delay units is coupled to the signal receiving end, a matched filter coupled to the signal receiving end, and a series of delay units for generating a matching value according to the preamble sequence, each delay unit outputs the signal received from the receiving end, and a correlation value between the signals outputted by each delay unit. A power meter is coupled to the signal receiving end and the series of delay units to generate a total power value according to the signals received by the signal receiving end and power of the signals outputted by each delay unit, and a division unit coupled to the matched filter and the power meter for calculating a correlation value between the matched value and the total power value.

The claimed invention further discloses a packet detection device comprising a signal receiving end for receiving signals, a series of delay units comprising a plurality of delay units connected in a sequence, each delay unit is utilized for delaying signals by a clock cycle, and a first delay unit of the plurality of delay units is coupled to the signal receiving end, a matched filter coupled to the signal receiving end and the series of delay units for generating a matched value according to the preamble sequence from the signals received by the signal receiving end and a correlation value between the signals outputted by each delay unit, a power meter coupled to the signal receiving end and the series of delay units for generating a total power value according to the signals received by the signal receiving end and power of the signals outputted by each delay unit, and a logic unit coupled to the matched filter and the power meter to determine whether a packet is received according to the matched value and the total power value.

The claimed invention further discloses a method comprising receiving a packet, generating a matched value of the packet and a plurality of time frequency code, generating a total power value of the packet, determining a timing position of the time frequency code and a fast Fourier transform sampling window for the packet according to the signal outputted by the packet detection system, and selecting a frequency band and executing synchronization according to the timing position of the time frequency code and the fast Fourier transform sampling window of the packet.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
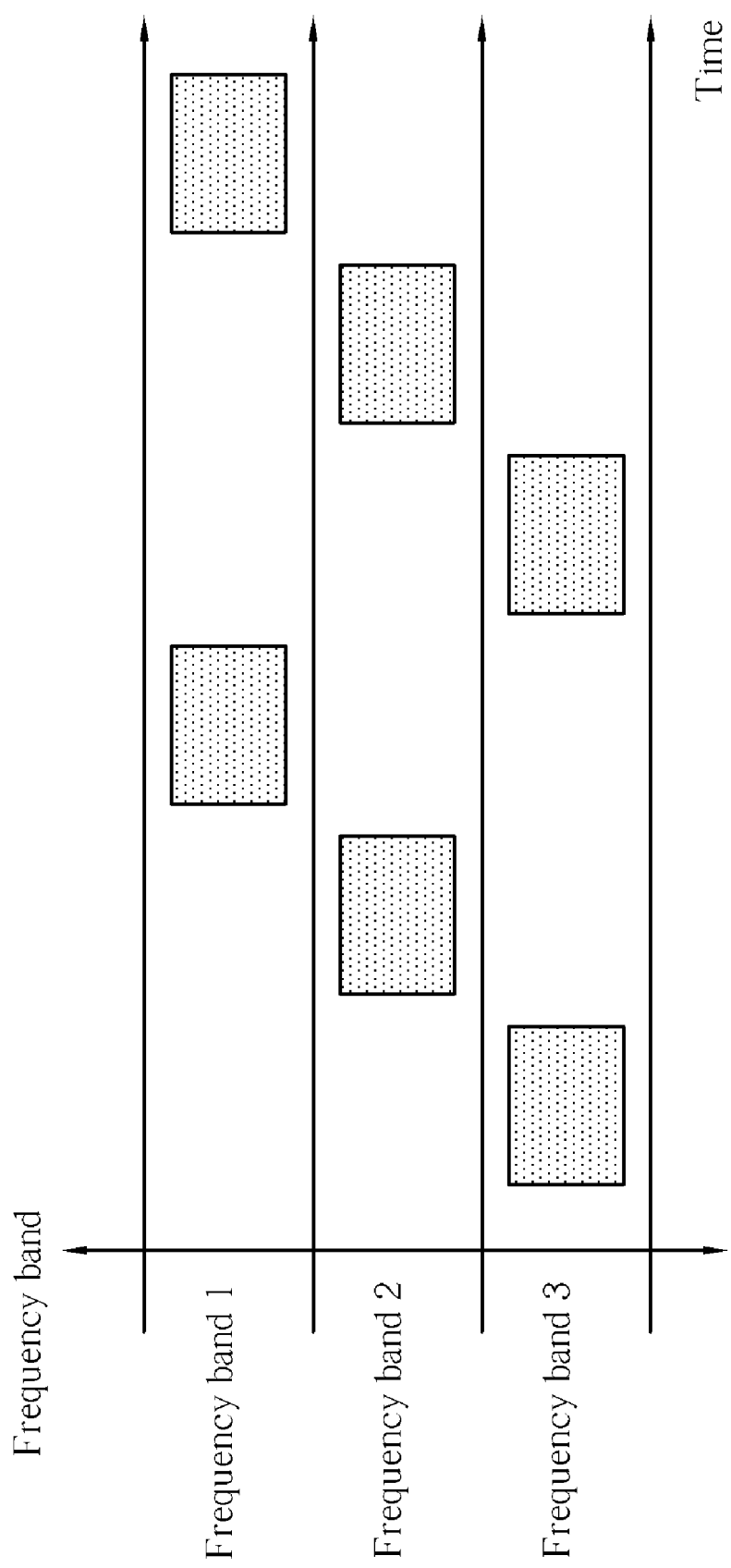
FIG. 1 illustrates a diagram of a multi-band orthogonal frequency division multiplexing system transmitting signal in a time-interleaved method.
Figure 2:
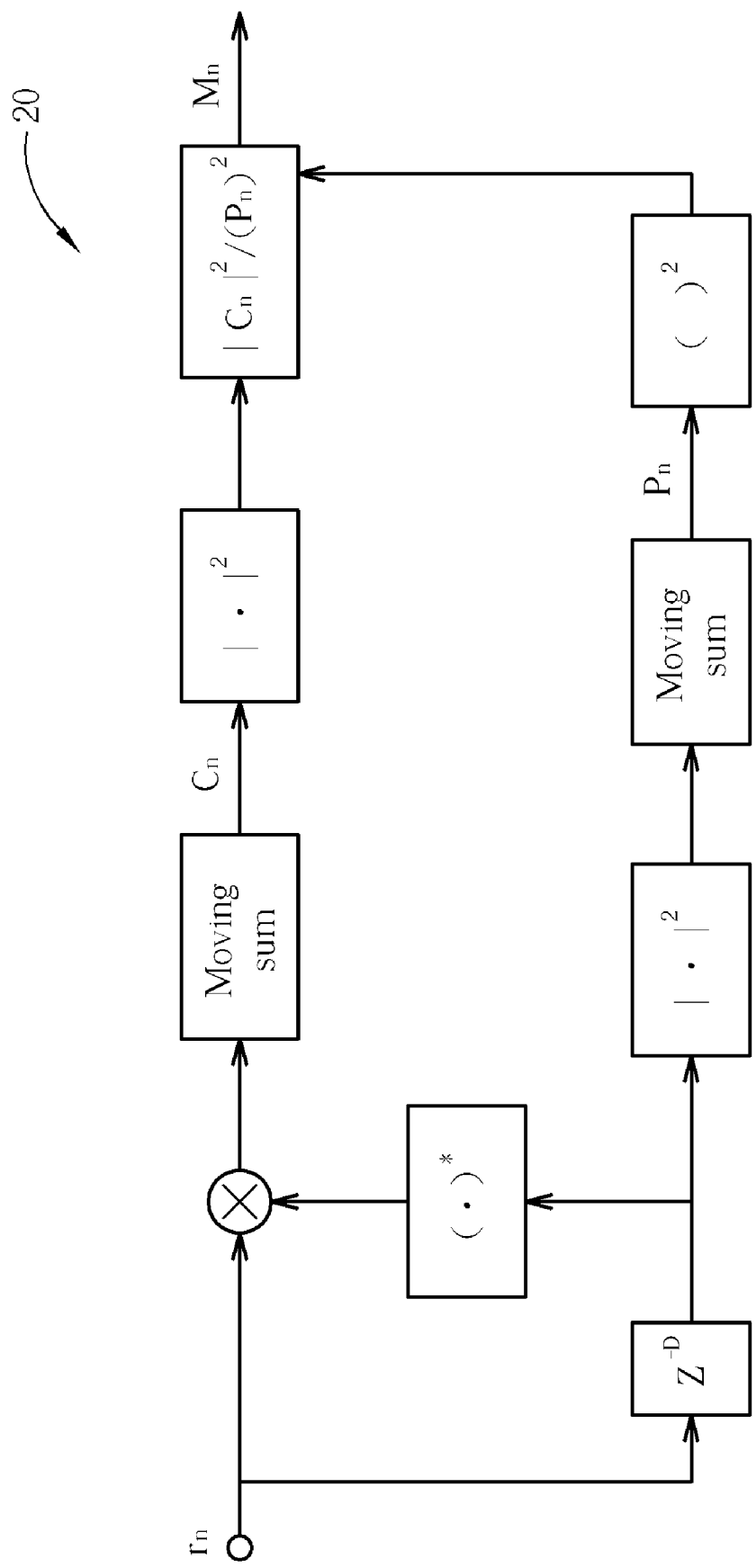
FIG. 2 illustrates a diagram of a conventional packet detection device.
Figure 3:
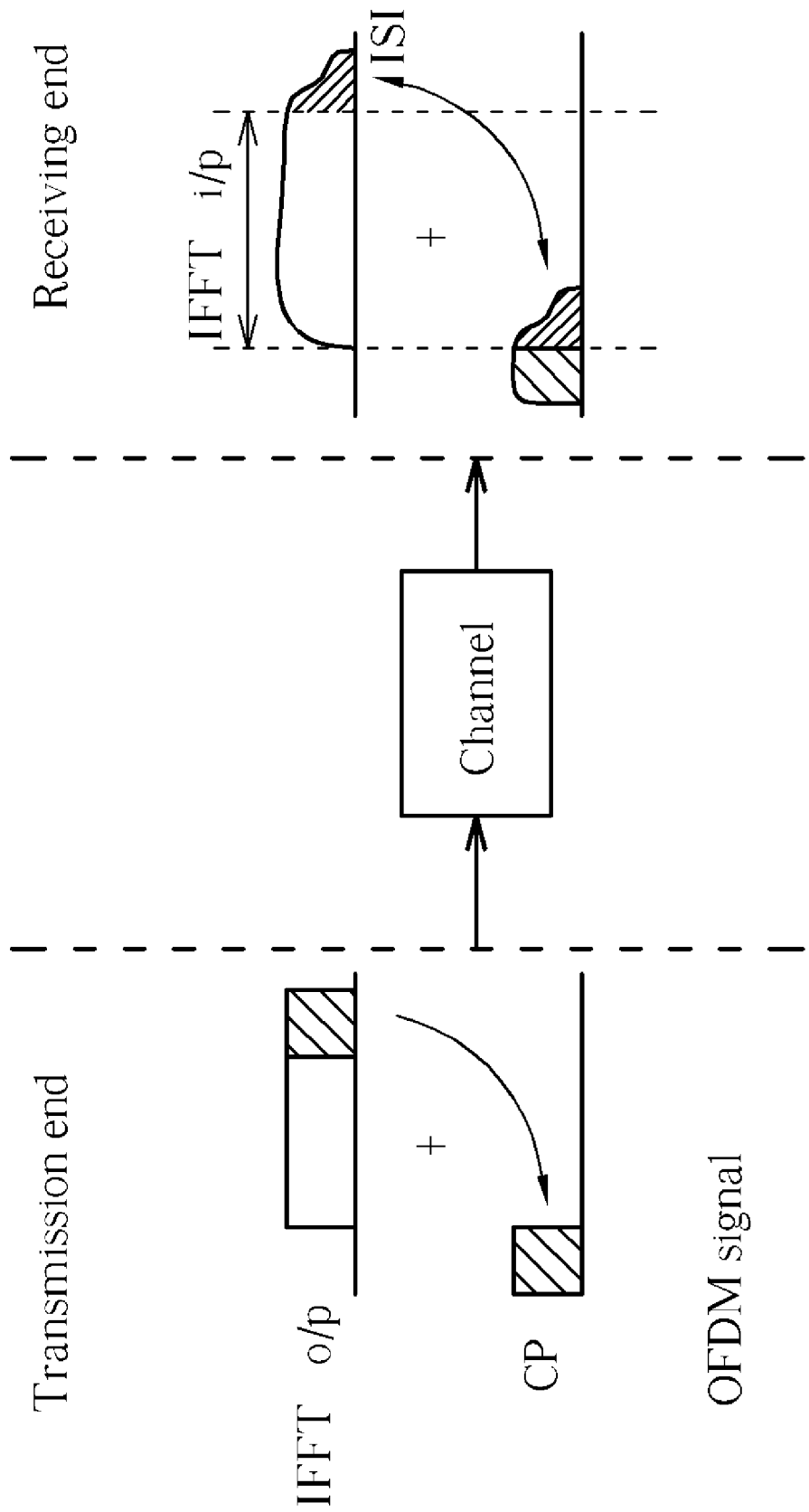
FIG. 3 illustrates a diagram of a multi-band orthogonal frequency division multiplexing system transmitting and receiving signals when a cyclic method is added.
Figure 4:
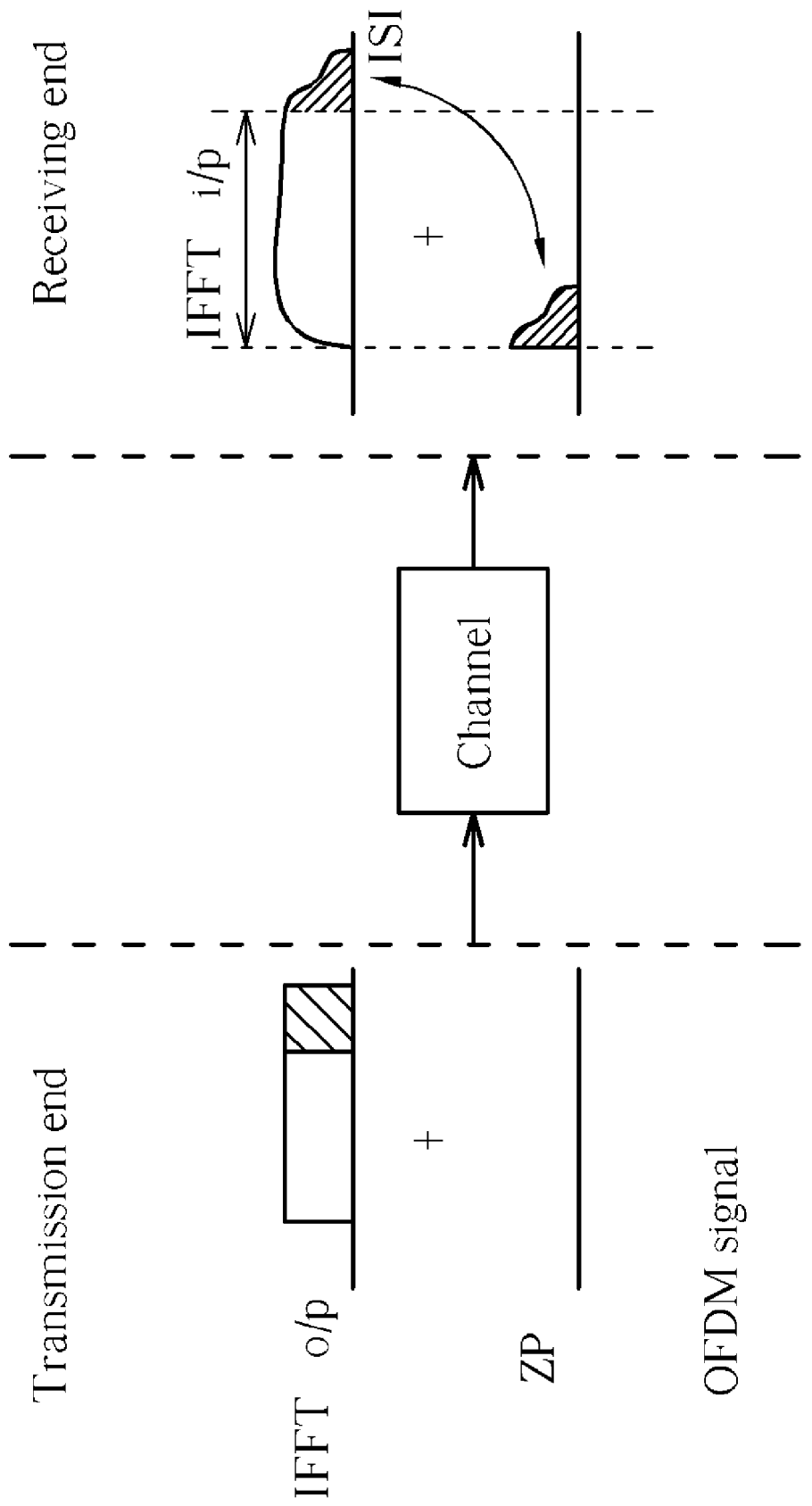
FIG. 4 illustrates a diagram of a multi-band orthogonal frequency division multiplexing system transmitting and receiving signals when a zero-padding prefix method is added.
Figure 5:
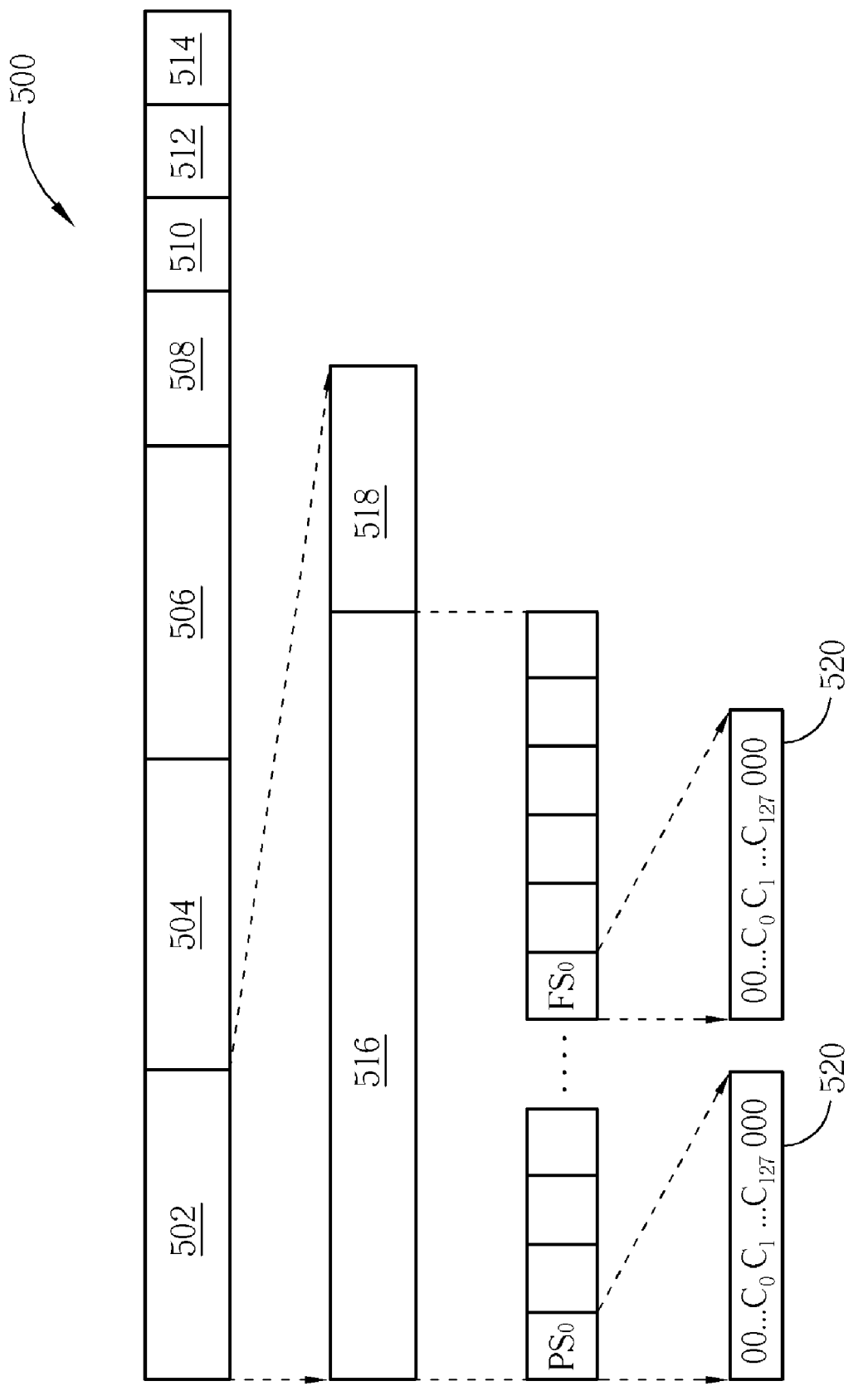
FIG. 5 illustrates a diagram of a physical layer convergence procedure packet.

This section details an ultra wideband system that utilizes a multi-band orthogonal frequency division multiplexing technology. A packet is outputted from the transmission end, usually comprises a preamble block for defining information like timing and band of the packet. The preamble block corresponds to a preamble sequence of a predetermined time frequency code, and incorporates a plurality of coefficients. Please refer to FIG. 5. FIG. 5 illustrates a diagram of a Physical Layer Convergence Procedure (PLCP) packet 500. The physical layer convergence procedure packet 500 comprises a preamble block 502, a header 504, an optional extension 506, a payload 508, a check 510, a tail 512 and a padding 514. Each block of the physical layer convergence procedure packet 500 is well known to those skilled in the art and therefore it does not need to be further explained. The receiving end through the preamble block can perform calculations like synchronization, recovery carrier offset, and channel estimation. The preamble sequence 502 can also be split into two portions: a packet synchronization sequence and frame synchronization sequence 516, and a channel estimation sequence 518. Both the packet synchronization and frame synchronization sequence 516 and channel estimation sequence 518, are comprised of a plurality of smaller blocks. As referenced in FIG. 5, block $PS_0$ is utilized for executing packet synchronization, and block $FS_0$ is utilized for executing frame synchronization. Blocks $PS_0$ and $FS_0$ are formed by a preamble sequence 520 of a time frequency code comprising of a plurality of packet synchronization coefficients ($C_0$, $C_1$, $C_2$, ..., $C_{123}$, $C_{127}$) allowing the receiving end to select different timing and frequency hopping sequences accordingly. Therefore, the present invention is capable of detecting packets and determining time frequency sequencing according to the coefficients of different Time Frequency Codes (TFCs).

Figure 6:
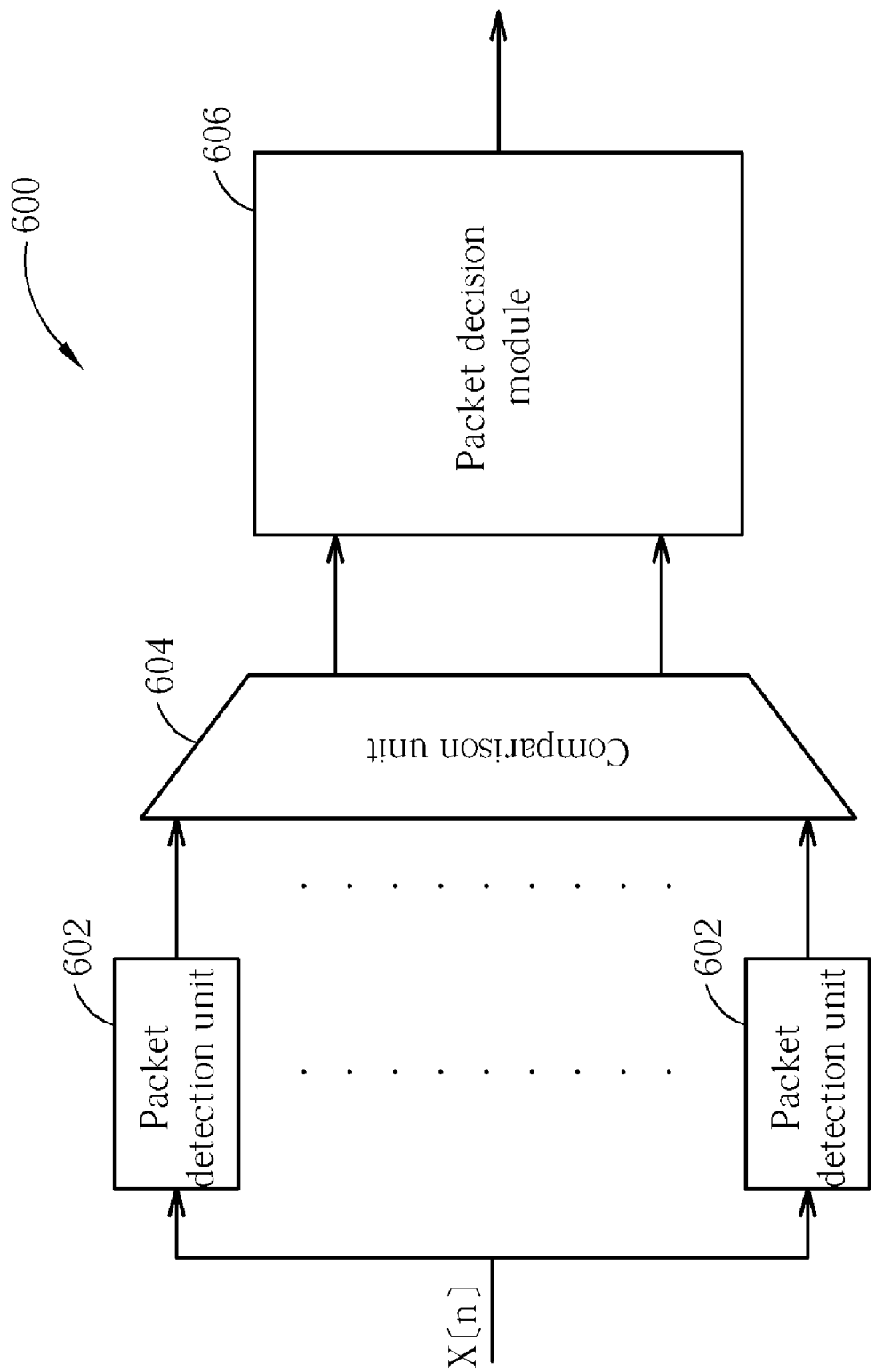
FIG. 6 illustrates a diagram of a packet detection system according to the present invention.

FIG. 6 illustrates a block diagram of the packet detection system 600 according to the present invention. The packet detection system 600 utilizes a multi-band orthogonal frequency division multiplexing (MB-OFDM) system. The packet detection system 600 comprises a plurality of packet detection units 602, a comparison unit 604 and a packet decision module 606. An input signal X[n] is transmitted to the plurality of packet detection units 602, with each packet detection unit 602 corresponding to a time frequency code for detecting a correlation value of the input signal X[n] and the corresponding TFC. The comparison unit 604 selects the greatest correlation value according to the plurality of correlation values determined by the packet detection unit 602, and the packet decision module 606 determines the type of the time frequency code and a fast Fourier transform (FFT) sampling window for the packet received. The packet decision module 606 then selects a frequency band and executes synchronization. Since different TFCs define different timing and frequency hopping sequences, the present invention is capable of setting a packet detection unit to correspond to different TFCs. The packet detection system 600 can determine a TFC via the packet detection unit 102 and then determine whether a packet is received so latter related operations can be executed.

Figure 7:
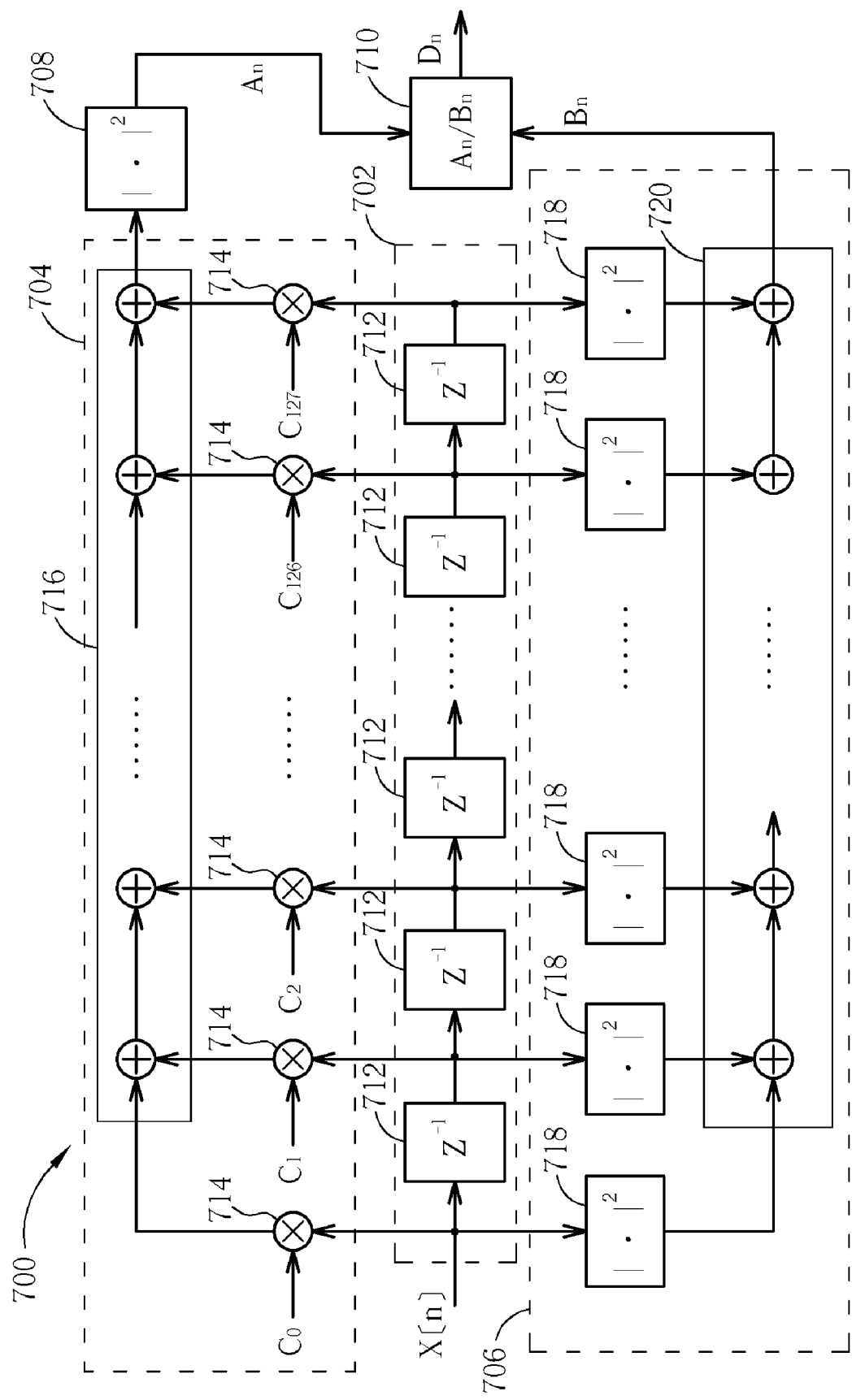
FIG. 7 illustrates a diagram of a packet detection unit.

In other words, the present invention can set a corresponding packet detection unit according to different time frequency code. Hence, a proper TFC can be selected and the problem of frequency hopping and timing detection can be solved. FIG. 7 illustrates a diagram of a packet detection unit 700. The packet detection unit 700 comprises a series of delay units 702, a matched filter 704, a power meter 706, a mathematical squaring unit 708 and a logic unit 710. The series of delay units 702 comprises a plurality of delay units 712 (please note in this example there are 127 delay units), each delay unit 712 is utilized for delaying signals by a clock cycle. The matched filter 704 comprises a plurality of multipliers 714 (please note in this example there are 128 multipliers) and an addition unit 716. The multiplier 714 is utilized for executing multiplicative calculations. With exception to the first multiplier 714, all multipliers 714 correspond to a delay unit 712 for outputting a multiplication of an output signal from the delay unit 712 with a coefficient ($C_1, C_2, \ldots, C_{127}$) of the preamble sequence, and the first multiplier 714 outputs a multiplication of the input signal X[n] with a coefficient $C_i$. After computation through the addition unit 716, the output signal of the addition unit 716 is then outputted to the squaring unit 708 to produce a rational squared absolute value. The power meter 706 comprises a plurality of squaring units 718 (please note in this example there are 128 squaring units) and an addition unit 720. With exception to the first squaring unit 718, all other squaring units 718 each correspond to a delay unit 712 to calculate the mathematical square of the absolute value from the output signal of the delay unit 712. Meanwhile, the first multiplier 714 calculates the mathematical square from the input signal X[n] itself, and outputs the value to the addition unit 720. The output signal of each squaring unit 718 will be added through the addition unit 720 and outputted to the logic unit 710. The logic unit 710 can comprise of a divider for calculating a correlation value of the packet according to the output signal of the squaring unit 708 and the addition unit 720.

The following section details the operational theory of the packet detection unit 700 described above. First, a coefficient vector of the preamble sequence in the MB-OFDM is defined as the size of the FFT sampling window, which means that:

$$C^H C = N \quad \text{(formula 1)}$$

where C represents the vector of the coefficient of the preamble sequence, and N represents the size of the fast Fourier transform sampling window.

At the same time, the correlation matrix of the output signal of the transmission end in the preamble must satisfy:

$$R_S = \sigma_S^2 C C^H \quad \text{(formula 2)}$$

where $\sigma_S^2$ represents the signal power.

Upon multiplication of formula 2 by $C^H$ and C, the result is:

$$C^H R_S C = C^H \sigma_S^2 C C^H C$$
$$\Rightarrow C^H R_S C = \sigma_S^2 C^H C C^H C$$
$$\Rightarrow C^H R_S C = \sigma_S^2 NN = \sigma_S^2 N^2 \quad \text{(formula 3)}$$

If the received signal is the unsynchronized data, then:

$$R_S = \sigma_S^2 I_N$$
$$C^H R_S C = N \sigma_S^2$$

If the received signal is only noise or the unsynchronized data, then the received signal complies with:

$$R_x = \sigma_x^2 I_N = \sigma_n^2 I_N$$

where $\sigma_n^2$ is the power of White Gaussian noise.

Otherwise, the output signal of the matched filter 704 will be:

$$A_n = C^H X(n) X^H(n) C$$
$$\tilde{A}_n \equiv E[A_n] = C^H E[X(n) X^H(n)] C = C^H R_X(n) C$$

Similarly, $$\tilde{B}_n \equiv E[B_n] = E[X(n)^H X(n)] = N \sigma_x^2$$

In an ideal channel, in a data period, then:

$$\tilde{A}_n \equiv E[A_n] = C^H R_X(n) C = N \sigma_n^2$$

in a preamble period, then:

$$\tilde{A}_n \equiv E[A_n] = C^H R_X(n) C = N^2 \sigma_S^2 \sigma_h^2 + N \sigma_n^2$$

therefore if an output $D_n$ of the logic unit 710 is in the data period, then:

$$\tilde{d}_n \equiv E[d_n] = \frac{\tilde{A}_n}{\tilde{B}_n} = \frac{N \sigma_n^2}{N \sigma_x^2} = 1$$

if in the preamble period, then:

$$\tilde{d}_n \equiv E[d_n] = \frac{\tilde{A}_n}{\tilde{B}_n} = \frac{N^2 \sigma_S^2 \sigma_h^2 + N \sigma_n^2}{N \sigma_x^2} = \frac{N \sigma_S^2 \sigma_h^2 + \sigma_n^2}{\sigma_x^2} = \frac{N \sigma_S^2 \sigma_h^2 + \sigma_n^2}{\sigma_S^2 \sigma_h^2 + \sigma_n^2}$$

(formula 4)

as $$\frac{\sigma_S^2 \sigma_h^2}{\sigma_n^2}$$

equals to a signal to noise ratio (SNR), therefore formula 4 becomes:

$$\tilde{d}_n = \frac{N \cdot SNR + 1}{SNR + 1} \quad \text{(formula 5)}$$

Inspection of formula 5 shows that when the SNR is large ($\sigma_S^2 \sigma_h^2 \gg \sigma_n^2$), the output of the logic unit 710 reduces to:

$$\tilde{d}_n \approx N$$

and when the SNR is small ($\sigma_S^2 \sigma_h^2 \ll \sigma_n^2$), then the output of the logic unit 710 can be approximated by:

$$\tilde{d}_n \approx N \cdot SNR + 1$$

Therefore, the output of the logic unit 710 is limited within a specific range, and the threshold value of the input signal is not affected by power. Furthermore, under a poor transmission environment (e.g., when the SNR is low), the packet detection unit 700 of the present invention can still operate normally.

The level of the threshold value will not affected by the power of the input signal through the packet detection unit 700. An autocorrelation and a cross-correlation value (between the input signal and the preamble coefficient) can also be obtained simultaneously (i.e., the power value and the matched value). Since the output signal is being limited within a predetermined range, the packet detection unit 700 can still function normally at different SNR channels. In comparison with the present invention, when the prior art is under a low SNR environment, the packet detection unit cannot determine the packet accurately.

Figure 8:
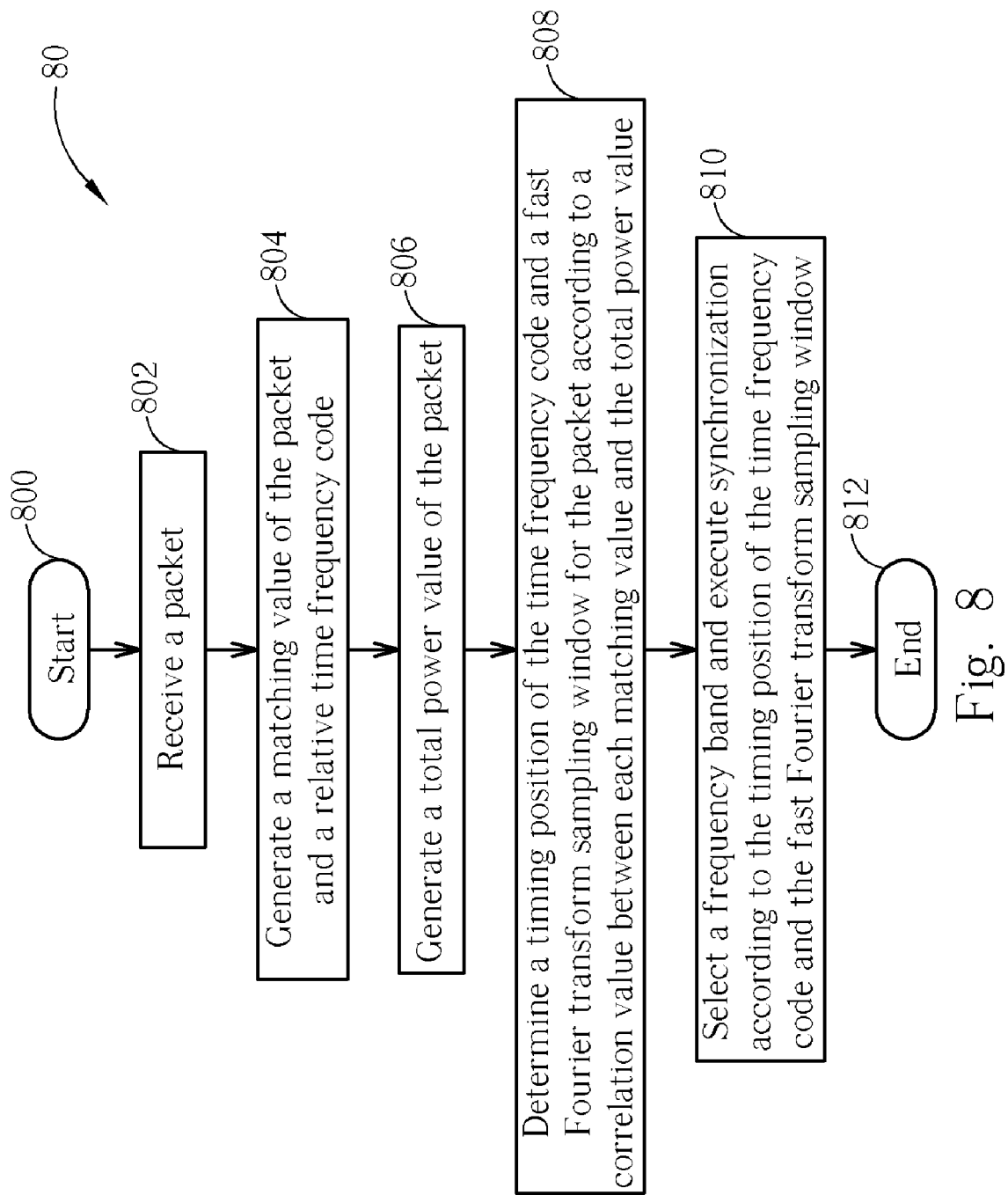
FIG. 8 illustrates a flowchart of a flow of processing packets by a receiving end of a multi-band orthogonal frequency division multiplexing system according to the present invention.

In order to select a frequency band and execute synchronization accurately, the present invention provides a method of processing packets by a receiving end of a multi-band orthogonal frequency division multiplexing system. FIG. 8 describes this process through a flowchart of a flow 80 of processing packets by a receiving end of a multi-band orthogonal frequency division multiplexing system according to the present invention. The flow 80 comprises the following steps:

Step 800: start;

Step 802: receive a packet;

Step 804: generate a matched value of the packet and a relative time frequency code (TFC);

Step 806: generate a total power value of the packet;

Step 808: determine a timing position of the TFC and a fast Fourier transform (FFT) sampling window for the packet according to a correlation value between each matched value and the total power value;

Step 810: select a frequency band and execute synchronization according to the timing position of the TFC and the FFT sampling window of the packet; and Step 812: end.

With reference to the flow 80 described in FIG. 8, the present invention determines the timing position of the time frequency code and a fast Fourier transform sampling window for the packet according to a comparison value between the matched value outputted by each matched filter and the total power value outputted by the power meter. Furthermore, when determining the timing position of the time frequency code and a fast Fourier transform sampling window for the packet, the present invention can check whether the correlation value has exceeded the threshold value in order to declare the packet arrival or the suitable FFT position.

Figure 9:
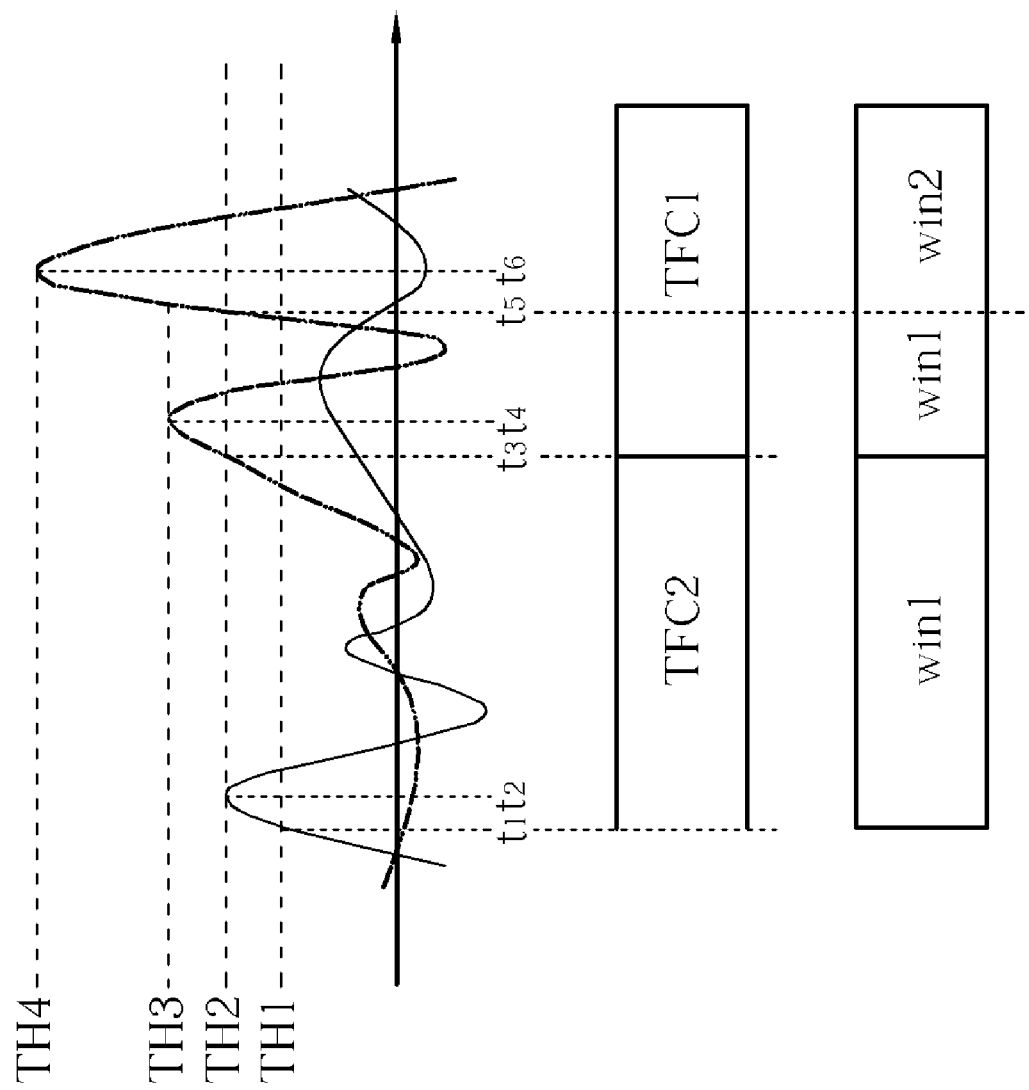
FIG. 9 illustrates a diagram of determining a timing position of the time frequency code and a fast Fourier transform sampling window according to the present invention.

When determining a new time frequency code, the receiving end is set to correspond to this new code. If the correlation value exceeds the threshold value, the threshold value is again then set to new value. For example, as illustrated in FIG. 9, when a new threshold value TH2 is being detected at time t1, the present invention then switches the initial threshold value from TH1 to TH2. Similarly, the present invention sets a threshold value TH3 at time t4, and a new threshold value TH4 is further set at time t6. When an initial time frequency code TFC2 is required to be changed to a new time frequency code TFC3 at time t3 according to the threshold values, we can determine an initial position of the fast Fourier transform sampling windows WIN 1 and WIN 2.

In conclusion, as different TFCs set different timing and frequency hopping sequences, therefore the present invention locates a packet detection unit to correspond to various time frequency code. Through the packet detection unit in this present invention, we are capable of determining the time frequency code and whether or not the packet is received in order that the latter operations can be performed. Furthermore, the dynamic range of the divider output (or the correlation value) will not be affected by the power of the input signal, while the autocorrelation value and the cross-correlation value can be simultaneously obtained. An important point to note is that the output signal of the device is limited by a predetermined range so that the packet detection unit in the present invention can still function normally at different SNR channels. Thus the timing position of the time frequency code and a fast Fourier transform sampling window for the packet can be determined so that a frequency band can be selected and synchronization can be executed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A packet detection system utilized in a multi-band orthogonal frequency division multiplexing system comprising:

a plurality of packet detection units, each packet detection unit corresponding to a time frequency code for detecting packets according to a preamble sequence of the time frequency code, each packet detection unit comprising:

a signal receiving end for receiving signals;

a series of delay units comprising a plurality of delay units connected in a sequence, each delay unit being utilized for delaying signals by a clock cycle, and a first delay unit in the plurality of delay units being coupled to the signal receiving end;

a matched filter coupled to the signal receiving end and the series of delay units for generating a matched value according to the preamble sequence, the signals received by the signal receiving end and a correlation value between the signals outputted by each delay unit;

a power meter coupled to the signal receiving end and the series of delay units for generating a total power value according to the signals received by the signal receiving end and power of the signals outputted by each delay unit; and a division unit coupled to the matched filter and the power meter for calculating a correlation value of the matched value and the total power value;

a comparison unit for comparing the correlation values outputted by the division units of the plurality of packet detection units; and a packet decision module for determining a timing position of the time frequency code and a fast Fourier transform sampling window for the packet received by the packet detection system according to the signal outputted by the packet detection system.

2. The packet detection system of claim 1 wherein the matched filter comprises:

a plurality of multipliers, each multiplier comprising a first input end coupled to an output end of a delay unit in the series of the delay units, and a second input end utilized for receiving the coefficient of the preamble sequence; and an adding unit coupled to the output end of each delay unit for calculating a total sum of output signals of the plurality of multipliers.

3. The packet detection system of claim 2 wherein the matched filter further comprises a multiplier wherein a first input end is coupled to the signal receiving end, a second input end is utilized for receiving the coefficient of the preamble sequence, and an output end is coupled to the adding unit.

4. The packet detection system of claim 1 wherein the power meter comprises:
a plurality of squaring units, each squaring unit being coupled to an output end of a delay unit of the series of delay units for calculating the mathematical square of an absolute value; and
an adding unit coupled to an output end of each squaring unit for calculating a total sum of output signals of the plurality of squaring units.

5. The packet detection system of claim 4 wherein the power meter further comprises a squaring unit wherein an input end is coupled to the signal receiving end, and an output end is coupled to the adding unit.

6. The packet detection system of claim 1 wherein each packet detection unit further comprises a squaring unit installed between the matched filter and the division unit.

7. The packet detection system of claim 1 wherein each signal received by the signal receiving end comprises a preamble block.

8. The packet detection system of claim 1 wherein the plurality of packet detection units share and utilize a power meter.

9. The packet detection system of claim 1 wherein the packet decision module determines a size of the time frequency code and the fast Fourier transform sampling window for a packet according to the correlation value outputted by the plurality of packet detection units.

10. The packet detection system of claim 9 wherein the packet decision module selects a frequency band and performs further synchronization according to the size of the time frequency code and the fast Fourier transform sampling window for the packet.

11. A packet detection device comprising:
a signal receiving end for receiving signals;
a series of delay units comprising a plurality of delay units connected in a sequence, each delay unit being utilized for delaying signals by a clock cycle, and a first delay unit of the plurality of delay units being coupled to the signal receiving end;
a matched filter coupled to the signal receiving end and the series of delay units for generating a matched value according to the preamble sequence, the signals received by the signal receiving end, and the correlation between the signals outputted by each delay unit;
a power meter coupled to the signal receiving end and the series of delay units for generating a total power value according to the signals received by the signal receiving end and power of the signals outputted by each delay unit; and
a logic unit coupled to the matched filter and the power meter for determining whether a packet is received according to the matched value and the total power value.

12. The packet detection device of claim 11 wherein the matched filter comprises:
a plurality of multipliers, each multiplier comprising a first input end coupled to an output end of a delay unit of the series of the delay units, and a second input end utilized for receiving a coefficient of the preamble sequence; and
an adding unit coupled to the output end of each delay unit for calculating a total sum of output signals of the plurality of multipliers.

13. The packet detection device of claim 12 wherein the matched filter further comprises a multiplier wherein a first input end is coupled to the signal receiving end, a second input end is utilized for receiving a coefficient of the preamble sequence, and an output end is coupled to the adding unit.

14. The packet detection device of claim 11 wherein the power meter comprises:
a plurality of squaring units, each squaring unit being coupled to an output end of a delay unit of the series of delay units for calculating the mathematical square of its absolute value; and
an adding unit coupled to an output end of each squaring unit for calculating a total sum of output signals of the plurality of squaring units.

15. The packet detection device of claim 14 wherein the power meter further comprises a squaring unit wherein an input end is coupled to the signal receiving end, and an output end is coupled to the adding unit.

16. The packet detection device of claim 11 further comprising a squaring unit installed in between the matched filter and the division unit.

17. The packet detection device of claim 11 utilized in a receiving end of a wireless communication system.

18. The packet detection device of claim 17 wherein the wireless communication system is a multi-band orthogonal frequency division multiplexing system.

19. A method of receiving and processing a packet utilized in a multi-band orthogonal frequency division multiplexing system, the method comprising the following steps:
(a) receiving a packet with a packet detection unit;
(b) generating a matched value of the packet and a plurality of time frequency codes with the packet detection unit;
(c) generating a total power value of the packet with packet detection unit;
(d) determining a timing position of the time frequency code and a fast Fourier transform sampling window for the packet with a packet decision module according to a correlation value between each matched value and the total power value; and
(e) selecting a frequency band and executing synchronization with the packet decision module according to the timing position of the time frequency code and the fast Fourier transform sampling window for the packet.

20. The method of claim 19 wherein step (d) comprises a comparison between a correlation value and a threshold value, when the correlation value exceeds the threshold value, the correlation value is set to be the threshold value, and the timing position of the fast Fourier transform sampling window for the packet is determined according to the threshold value.

* * * * *